United States Patent
Ida

(10) Patent No.: US 7,310,591 B2
(45) Date of Patent: Dec. 18, 2007

(54) FACTOR ESTIMATING DEVICE, METHOD AND PROGRAM RECORDING MEDIUM THEREFOR

(75) Inventor: Masaki Ida, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/653,244

(22) Filed: Jan. 11, 2007

(65) Prior Publication Data

US 2007/0168156 A1   Jul. 19, 2007

(30) Foreign Application Priority Data

Jan. 17, 2006   (JP)   ............. 2006-009281

(51) Int. Cl.
    *G06F 11/30*   (2006.01)
    *G21C 17/00*   (2006.01)
(52) U.S. Cl. ..................... 702/182; 702/183
(58) Field of Classification Search ............... 702/182, 702/183
    See application file for complete search history.

(56) References Cited

U.S. PATENT DOCUMENTS

2006/0212279 A1* 9/2006 Goldberg et al. ............ 703/2
2006/0287843 A1* 12/2006 Matsushita et al. ........ 702/185

FOREIGN PATENT DOCUMENTS

| JP | 02-247576 | 10/1990 |
|---|---|---|
| JP | 06-196900 | 7/1994 |
| JP | 07-055868 | 3/1995 |
| JP | 2003-108375 | 4/2003 |

OTHER PUBLICATIONS

Japan patent application publication No. 2001-523026, machine translation into English, Nov. 20, 2001.
Japan patent application publication No. 2001-519559, machine translation Into English, Oct. 23, 2001.

* cited by examiner

*Primary Examiner*—Michael Nghiem
(74) *Attorney, Agent, or Firm*—Beyer Weaver LLP

(57) ABSTRACT

A factor estimating device estimates a factor from a defective result generated in a target system for diagnosis. A factor estimating process is carried out based on causality network recorded in an estimate knowledge recording part, and data on input items corresponding to conditions included in the causality network are obtained. Based on the obtained data, fitness factors are calculated, and certainty factor is obtained for each factor as representing the group of fitness factors corresponding to conditions included in the factor estimating paths. Influence factors showing the degree of influence of obtained data on input items are calculated, and data on input items with high influence factor are obtained.

17 Claims, 13 Drawing Sheets

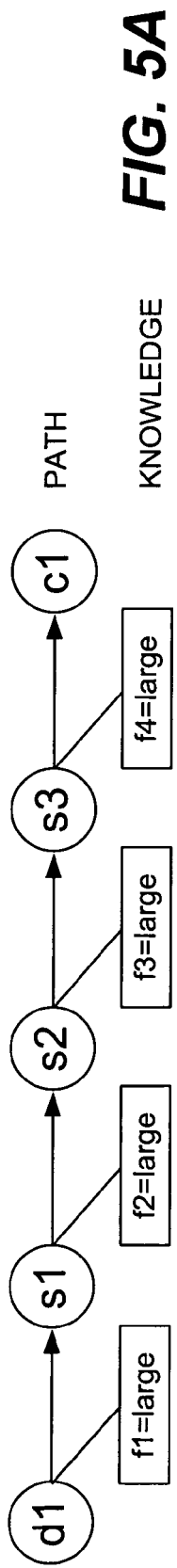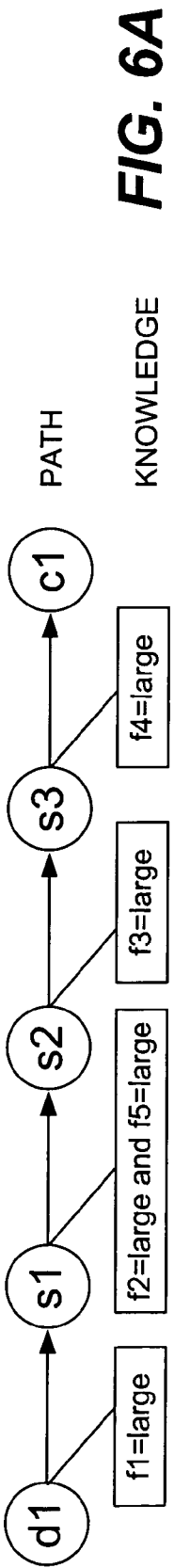

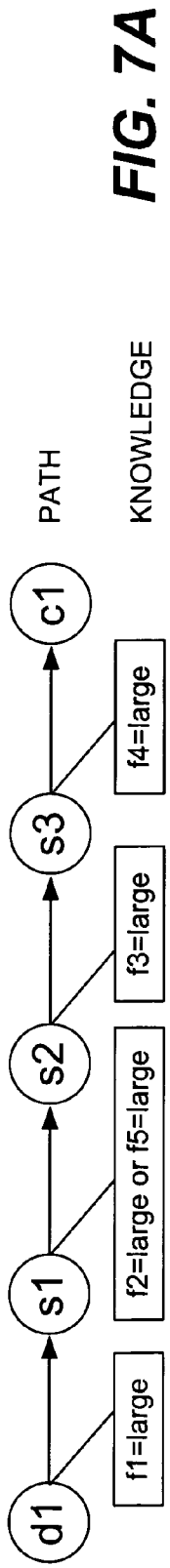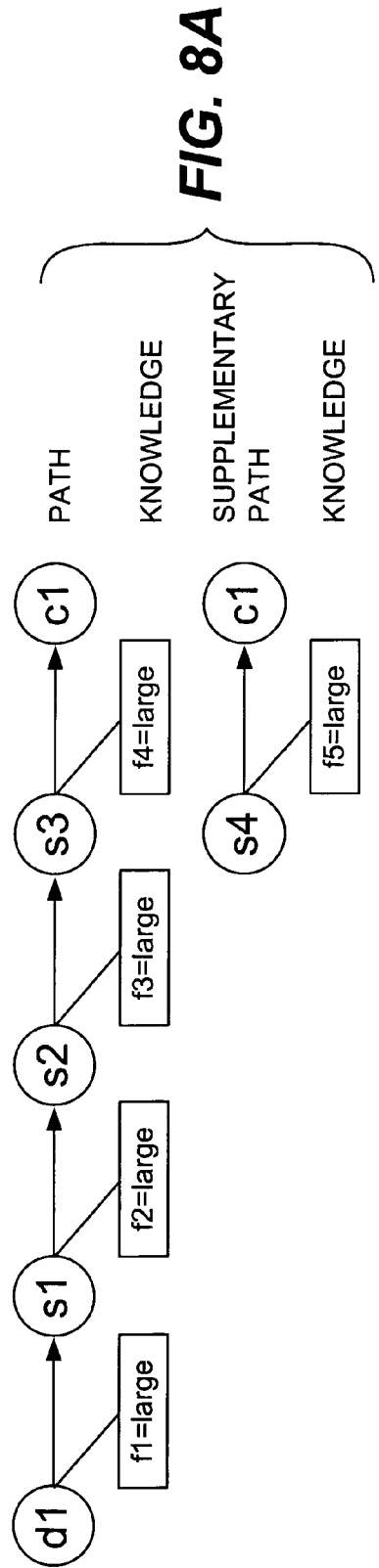

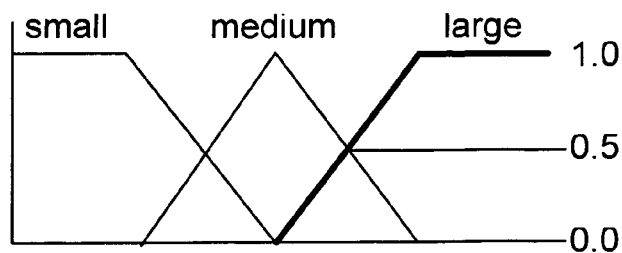
FIG. 9A
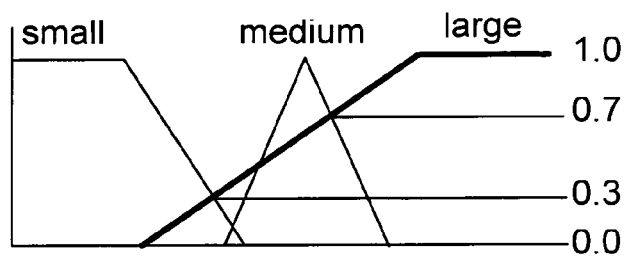
FIG. 9B
|  | Certainty factor |
|---|---|
| No-good factor c1 | 0.0 |
| No-good factor c2 | 0.7 |
| No-good factor c3 | 0.9 |
| No-good factor c4 | 0.5 |
| ⋮ | ⋮ |
FIG. 10
| Group ID | Item ID |
|---|---|
| G1 | T1, T6 |
| G2 | T8, T9, T23 |
| ⋮ | ⋮ |
FIG. 11

| Item ID | Person and/or inspection result | Question ID | Calculation algorithm |
|---|---|---|---|
| T1 | Person or inspection result | Q1 | Total sum of absolute values of output from displacement detection sensor for one target substrate |
| T2 | Person | Q2 | NULL |
| T3 | Inspection result | NULL | Average temperature of reflow oven at the production item of specified lot |
| T4 | Person | Q3 | NULL |
| ⋮ | ⋮ | ⋮ | ⋮ |

*FIG. 12*

| Question ID | Question | Selection branches |
|---|---|---|
| Q1 | Isn't component displaced? | Displaced/Not displaced |
| Q2 | Check the amount of solder paste. | Too much/Proper/Too little |
| Q3 | Isn't component dirty? | Dirty/Not dirty |
| ⋮ | ⋮ | ⋮ |

*FIG. 13*

| Input item ID | Data |
|---|---|
| T1 | TRUE |
| T2 | LARGE |
| T3 | 3.228 |
| T4 | NULL |

*FIG. 14*

FACTOR ESTIMATING DEVICE, METHOD AND PROGRAM RECORDING MEDIUM THEREFOR

This application claims priority on Japanese Patent Application 2006-009281 filed Jan. 17, 2006.

BACKGROUND OF THE INVENTION

This invention relates to factor estimating device, method and program for estimating factor of a result that takes place in a target system under diagnosis, as well as a recording medium for recording such a factor estimating program. In particular, this invention relates to a production process management device for managing production processes of target products.

Processes for improving production steps are being required for factory production lines in order to improve the yields. In such an improvement process, steps that cause defective products are identified and apparatus are adjusted and cleaned so as to eliminate factors that cause such defective products.

In a production process including a large number of steps, however, a variety of candidates are considered as factors of causing defective products such as defective components of the production apparatus, problems involved in the setting of the production apparatus and the problems related to the routes of transportation. For example, the processes of a system for surface-mounting circuit boards may be divided into the printing, mounting and reflow steps. The printing step is where a solder paste is applied to a substrate, and the mounting step is where components are set on the substrate. In the final reflow step, heat is applied to melt the solder to attach the components. If a bridge defect occurs in such a surface-mounting system, displacement of the mask and the unclean female mold may have contributed as the cause of the defect but one or more of them may be the basic factor.

When a phenomenon that becomes a factor of a defect appears, not only does a symptom of the defect appear in the products, but there also appear some effects in the operation history of the production apparatus and the inspection history of the inspection apparatus. The amount of data related to the symptoms of these defective products and to the operation history of the production apparatus and the inspection history of the inspection apparatus becomes enormous, making it very difficult to carry out any analysis on the occurrence of the defects.

Persons in charge of production management with a lot of experience in production management may know empirically the relationship among the effects of such factors on the production and inspection apparatus and how to interpret such effects and may be able to effectively improve the production steps. Inexperienced production managers will have to examine many candidate factors one at a time to finally identify a real factor, and it turns out to be a very time-consuming effort to improve the production steps.

It is therefore being desired to provide a method of highly accurately and efficiently estimating factors of any abnormal situation independently of the level of skill of the production manager. Japanese Patent Publication Tokkai 6-196900, for example, disclosed a method of obtaining data from inspecting apparatus individually provided to each of the printing, mounting and reflow steps and making an estimate based on such data. In the case of a surface-mounting system, however, there is no guarantee that all data necessary for estimating a factor can be obtained from such inspecting apparatus. Although the area of solder as seen from the front of the substrate may be obtained by an image processing technology, for example, data on the warping of the substrate can be obtained only by a visual observation by a viewer from the side. Although a device for detecting the warping of the substrate may be considered, it is not desirable to allow the total cost of the inspecting apparatus to increase unnecessarily. In other words, it is preferable to input data from human observers in addition to data obtained from an inspection apparatus. This is to say that cooperation between an inspection apparatus and a human observer is preferable for estimating factors.

In general, knowledge data are of a network structure and a search is carried out from a root node along a path. In order to make an efficient estimate, therefore, it is necessary to optimize this network structure. This may be done, for example, by making an important item for the estimate as a node on an upstream side, but it will involve large amounts of labor and cost. In addition, so-called important items may change, depending on the circumstances of making the estimate. In summary, it is extremely difficult to form a network structure capable of efficiently making an estimate according to a variety of circumstances.

SUMMARY OF THE INVENTION

It is therefore an object of this invention in view of the problems described above to provide a factor estimating device capable of efficiently making an estimate, independent of the network structure.

A factor estimating device according to this invention is for estimating a factor from a result generated in a target system for diagnosis and is characterized as comprising an estimate knowledge recording part for recording factor estimating knowledge data that correlate one or more candidates for factor to each of a plurality of results that may be generated in the target system and show factor estimating paths from each of the results to each of the candidates corresponding to each result as knowledge of a network structure having condition branches, inference processing means for carrying out factor estimating process based on the factor estimating knowledge data recorded in the estimate knowledge recording part, item data obtaining means for obtaining data on input item corresponding to conditions contained in the factor estimating knowledge data while the inference processing means carries out the factor estimating process, fitness calculating means for calculating fitness factors based on the data obtained by the item data obtaining means, the fitness factors being indicative of degrees to which the conditions are satisfied, certainty calculating means for calculating for each of the factors a representative value of an assembly of fitness factors corresponding to a condition contained in the factor estimating paths as certainty factor, and influence calculating means for calculating influence factor for each of input items indicative of degree of influence on the certainty factor when the data on the input item are obtained regarding a certain input item. In the above, the item data obtaining means obtains data on a selected input item by considering the influence factors.

A factor estimating method of this invention is for estimating a factor from a result generated in a target system for diagnosis by means of a factor estimating device provided with an estimate knowledge recording part for recording factor estimating knowledge data that correlate one or more candidates for factor to each of a plurality of results that may be generated in the target system and show factor estimating paths from each of the results to each of the candidates corresponding to each result as knowledge of a network structure having condition branches. The method is characterized as comprising an inference step of carrying out factor estimating process based on the factor estimating knowledge data recorded in the estimate knowledge recording part, an item data obtaining step of obtaining data on input item corresponding to conditions contained in the factor estimating knowledge data during the factor estimating process in the inference step, a fitness calculating step of calculating fitness factors based on the data obtained in the item data obtaining step, the fitness factors being indicative of degrees to which the conditions are satisfied, a certainty calculating step of calculating for each of the factors a representative value of an assembly of fitness factors corresponding to a condition contained in the factor estimating paths as certainty factor, and an influence calculating step of calculating influence factor for each of input items indicative of degree of influence on the certainty factor when the data on the input item are obtained regarding a certain input item. In the above, the item data obtaining means obtains data on a selected input item by considering the influence factors.

According to this invention, a factor estimating process is carried out based on factor estimating knowledge data which show the factor estimating paths from each result to each of the factors corresponding to that result as knowledge in a network structure having condition branches. This factor estimating process is carried out by obtaining data on input items corresponding to the conditions contained in the factor estimating knowledge data. Fitness factors indicative of the degrees to which conditions are satisfied are calculated during this process, and a value representing the group of fitness factors corresponding to the conditions contained in the factor estimating paths is calculated as certainty factor for each factor. For each input item, an influence factor for indicating the degree of influence on the certainty factor when data on that input item are obtained is calculated, and data on input item having a high influence factor are obtained.

Thus, since data are obtained from input items with a high influence factor, or input items that are important in estimating factors, independent of the factor estimating paths, factors can be estimated efficiently. The network structure can be constructed easily, furthermore, since the network structure need not be optimized for carrying out the factor estimating process.

The influence factor may be calculated, for example, by obtaining predicted values which would be the influence factors if data were set for input items for which data are not obtained yet, calculating for each factor the difference between this predicted value and the current influence factor and calculating the total sum of these differences. Although it is preferable to obtain data from the input item with the highest influence factor, data may be obtained from an input item with such influence factor that estimated factors can change when data are obtained. Examples of the value which represents the group of fitness factors include the minimum value and the average value.

As data are obtained from an input item with a high influence factor, however, consistency may be lost in the questions to be asked to the user for obtaining data from input items because there is no relationship to the factor estimating paths. For this reason, the factor estimating device of this invention may preferably further comprise an aimed node determining means for determining as an aimed node, when data obtained by the item data obtaining means satisfy a condition, the node to which the satisfied condition branches, and the item data obtaining means obtains data of an input item with a high (or highest) influence factor selected out of those of input items corresponding to the aimed node and nodes on the downstream side of the aimed node.

With the device thus structured, the search area for input item on which data are to be obtained becomes limited to the downstream side of the aimed node. If the obtained data on the input item satisfy the condition, the node to which the condition branches is determined as the aimed node. In this way, the search area becomes further narrowed down. Thus, when questions are posed to the user in order to obtain data on input items, the questions will be corresponding to the input items within the gradually narrowing search area and hence the consistency in the flow of questions is not adversely affected.

If the aimed node moves gradually in the downstream direction, there finally ceases to exist any input item on which data are to be obtained. If the aimed node is then returned to a root node, there is the possibility of selecting an input item that corresponds to a condition on a completely different path. In such a situation, the question made to the user for obtaining data on input item may become completely different, the flow of questions becoming interrupted. Thus, it is preferable that the aimed node determining means be adapted to determine an earlier determined aimed node as the aimed node if there is no input item with influence factor higher than a specified value. In this situation, since the search area returns to that immediately before the narrowing down, a flow of similar questions can be maintained. For this purpose, a memory device becomes necessary for recording the history of aimed nodes. A memory device of the last-in, first-out type is preferred for this purpose.

For maintaining the consistency in the flow of questions, the factor estimating device of this invention may further comprise a related item recording part for grouping and recording data on a plurality of related input items and the item data obtaining means obtains not only data on a selected input item by considering the influence factors but also data on input items that belong to same group as the selected input item.

When data of a selected input item with a high influence factor are obtained with a factor estimating device thus structured, data of other input items related to this selected input item are also obtained. In such a situation, the questions to the user asked for obtaining data on the related input items are likely to be also related and hence consistency of the flow of the questions can be maintained.

The factor estimating device of this invention may further comprise a related item recording part for grouping and recording data on a plurality of related input items, the item data obtaining means obtaining not only data on the selected input item by considering the influence factors but also data on input items that belong to the same group as the selected input item and have influence factors higher than a specified value. In this case, data on input items can be obtained efficiently because data on input items with low influence factors are not obtained.

The factor estimating device of this invention may still further comprise input control means for obtaining a user's response to a question corresponding to a condition contained in the factor estimating knowledge data, the item data obtaining means obtaining the data on the input item based on the response obtained by the input control means. In this case, the user and the factor estimating device can cooperate in estimating factors since data on input items are obtained based on responses from the user.

The factor estimating device of this invention may still further comprise inspection result inputting means for receiving inspection result data from an inspection device that inspects the target system, an inspection result recording part that records the inspection result data received by the inspection result inputting means and an obtaining method recording part for recording data on an obtaining method indicating whether the data on the input item are obtained either from a user or from the inspection result data or from both of them, as well as the data on the input item, the item data obtaining means obtaining the data on the input item based on the data on the obtaining method corresponding to the input item. In this case, the user, the inspection device and the factor estimating device can cooperate in estimating factors since data on input items are obtained based on the inspection result data from the inspection device.

The factor estimating device of this invention is particularly useful for a process managing device adapted to estimate causing factors of defects from a defective result generated in a processing system for carrying out processes on a target object.

The factor estimating device of this invention may be realized by a computer. In such a case, program storage devices readable by a machine, tangibly embodying a program of instructions executable by such computer are also considered to be within the scope of this invention.

In summary, the factor estimating device of this invention is capable of estimating a factor because data are obtained from input items with high influence factors, that is, input items that are important in estimating factors. Since the network structure need not be optimized for estimating factors efficiently, the network structure can be constructed easily according to this invention.

BRIEF DESCRIPTION OF THE DRAWINGS

FIG. 5A shows an example of diagnostic path and FIG. 5B shows the production rule generated by the diagnostic path of FIG. 5A.

FIGS. 6A, 7A and 8A show other examples of diagnostic path and FIGS. 6B, 7B and 8B respectively show the production rule generated by the diagnostic path of FIGS. 6A, 7A and 8A.

FIGS. 9A and 9B are examples of membership functions for three responses LARGE, MEDIUM and SMALL.

FIG. 10 is an example of current certainty factors recorded in the form of a table in the inference process temporary recording part of the process managing device of FIG. 1.

FIG. 11 is an example of group database recorded in the form of a table in the related item recording part of the process managing device of FIG. 1.

FIG. 12 is an example of item data obtaining method database recorded in the form of a table in the obtaining method recording part of the process managing device of FIG. 1.

FIG. 13 is an example of question database recorded in the form of a table in the question data recording part of the process managing device of FIG. 1.

FIG. 14 is an example of data on input items recorded in the form of a table in the inference process temporary recording part of the process managing device of FIG. 1.

DETAILED DESCRIPTION OF THE INVENTION

The invention is described next by way of one of its embodiments with reference to figures. It will be described as being applied to a process management system for a production system including a production line for printed circuit boards but it goes without saying that this is not intended to limit the scope of the invention. The present invention is applicable to the whole management of processing steps for target products. In the above, the processing steps for target products include, for example, production steps for industrial products, inspection steps for mining, industrial and agricultural products or materials, processing steps of discarded objects (such as industrial wastes and drain, offgas and refuse), inspection steps for wastes, inspection steps for equipment and recycling steps.

Figure 2:
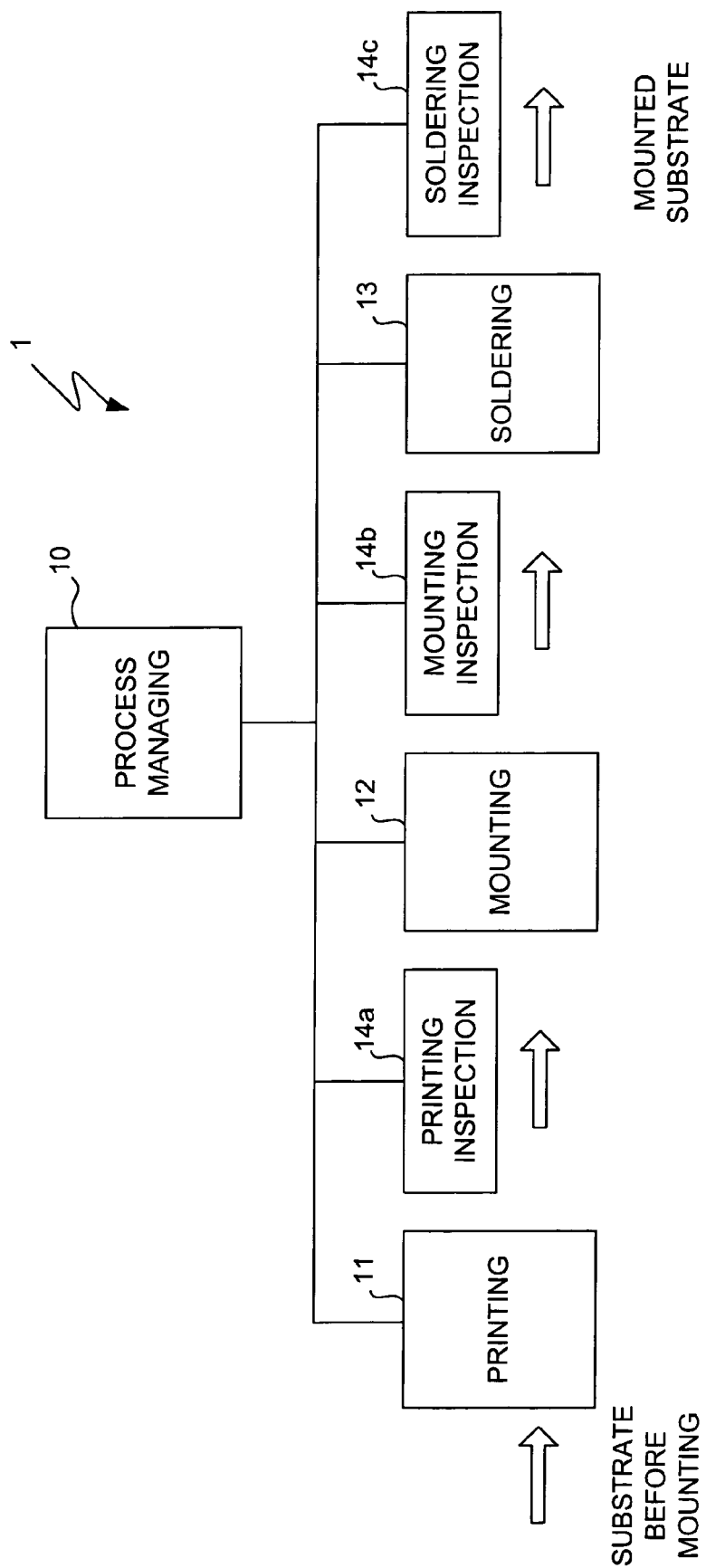
FIG. 2 is a block diagram of a production system including the process managing device of FIG. 1.

FIG. 2 shows a production (processing) system 1 for printed circuit boards to which a process managing system according to the embodiment of this invention is applied. The production system 1, as shown in FIG. 2, includes each of the steps necessary for the producing printed circuit boards such as the printing, mounting and reflow steps and is provided with a printing device 11 for carrying out the solder printing step whereby a solder is pasted on a substrate, a mounting device 12 for carrying out a component mounting step whereby electronic components are mounted to the substrate, a soldering device 13 for carrying out a reflow step whereby the electronic components on the substrate are soldered, and a process managing device (a factor estimating device) 10 for managing the production system 1. The printing device 11, the mounting device 12 and the soldering device 13 are arranged in this order from the upstream side to the downstream side with reference to the flow of products by this production system 1.

A printing inspection device 14a, a mounting inspection device 14b and a soldering inspection device 14c are disposed respectively near the printing device 11, the mounting device 12 and the soldering device 13. The printing inspection device 14a is for inspecting the quality of a substrate processed by the printing device 11, the mounting inspection device 14b is for inspecting the quality of a substrate processed by the mounting device 12, and the soldering inspection device 14c is for inspecting the quality of a substrate processed by the soldering device 13. In the following, the printing inspection device 14a, the mounting inspection device 14b and the soldering inspection device 14c may each be referred to simply as an inspection device 14 when there is no need to distinguish among them.

The process managing device 10 serves not only to manage the production system 1 as a whole but also to carry out the factor estimating process and the analyzing process to be described below. It is adapted to receive various data and instructions from the user as the production manager and to carry out various operations.

The process managing device 10, the printing device 11, the mounting device 12, the soldering device 13, the printing inspection device 14a, the mounting inspection device 14b and the soldering inspection device 14c are connected together by a communication line to together form a communication network. As a communication network, it may be of any type such as a LAN (local area network) as long as the devices can communicate among themselves.

Apart from the process managing device 10, a terminal device which may be operated by the user for an input operation may be provided and connected to this communication network such that inputs of data to the process managing device 10 and displays of various images may be effected through this terminal device.

Although FIG. 2 shows a particular example with each of the printing device 11, the mounting device 12 and the soldering device 13 being provided with a corresponding inspection device 14, the process managing device 10 as a whole may be provided with only one inspection device 14. For example, if the process managing device 10 is provided only with the soldering inspection device 14c, it is possible to detect defects occurring in the final production result.

Figure 1:
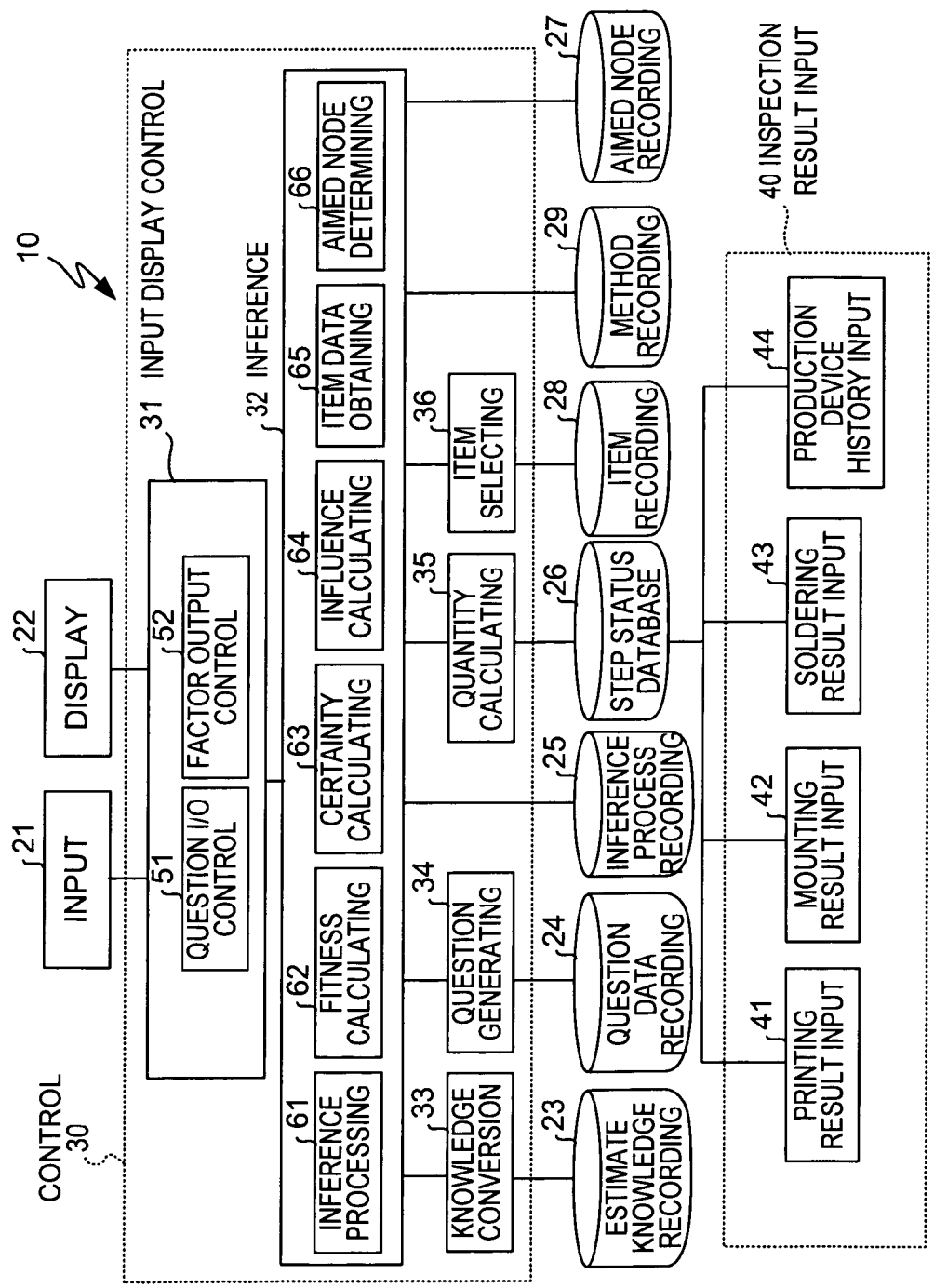
FIG. 1 is a block diagram of a process managing device embodying this invention.

FIG. 1 is referenced next to explain the structure of the process managing device 10. As shown in FIG. 1, the process managing device 10 is provided with a control part 30, an inspection result input part (inspection result inputting means) 40, an input part 21, a display part 22, an estimate knowledge recording part 23, a question data recording part 24, an inference process temporary recording part 25, a step status database (inspection result recording part) 26, an aimed node stack recording part 27, a related item recording part 28, and an item data obtaining method recording part 29.

The input part 21 is for receiving instructions from the user and the data inputs and may comprise key input means such as a keyboard and buttons and a pointing device such as a mouse. The display part 22 is for displaying the details of various processes by the process managing device 10 and may comprise a display device such as a liquid crystal display device or a CRT (cathode ray tube).

The inspection result input part 40 is for receiving data related to the inspection results of production process by the production system 1 and is provided with a printing result input part 41, a mounting result input part 42, a soldering result input part 43 and a production device history input part 44. The printing result input part 41 is for receiving the results of inspection by the printing inspection device 14a. The mounting result input part 42 is for receiving the results of inspection by the mounting inspection device 14b. The soldering result input part 43 is for receiving the results of inspection by the soldering inspection device 14c. The production device history input part 44 is for receiving data related to the production history from the printing device 11, the mounting device 12 and the soldering device 13.

The inspection result input part 40 needs only to be adapted to receive data related to the inspection results from at least one selected from the printing device 11, the mounting device 12, the soldering device 13, the printing inspection device 14a, the mounting inspection device 14b and the soldering inspection device 14c. For example, if it is adapted to receive only the inspection result data related to the result of soldering from the soldering inspection device 14c, it is still possible to detect defects occurring in the final production result.

The estimate knowledge recording part 23 is for recording factor estimating knowledge data. The factor estimating knowledge data are for searching for factors for each of defective results and are recorded as a causality network. Details of the causality network will be explained farther below.

The question data recording part 24 is for recording, as a question database, question data shown to the user when estimating factors. Each item of the question data contained in this question database is linked to an input item recorded in the item data obtaining method recording part 29. Details of this question database will be explained farther below. In the above, the input item is an item corresponding to the conditions between the nodes of the causality network. Its details also will be explained farther below.

The inference process temporary recording part 25 is for recording inference process data which are being obtained with the progress in inference during an inference process being carried out by an inference part 32. Details of the inference process data will be explained farther below.

The step status database 26 is a database recording data (inspection result data) related to the results of inspection in the production process by the production system 1 received by the inspection result input part 40. In other words, the results of inspection by the printing inspection device 14a, the mounting inspection device 14b and the soldering inspection device 14c as well as data related to the production history from the printing device 11, the mounting device 12 and the soldering device 13 are recording in the step status database 26.

The aimed node stack recording part 27 is for recording data on the node, which becomes a specified point (specifically, the node ID which identifies the node) in a stack format. The related item recording part 28 is for grouping the data on a plurality of related input items and recording them as a group database. The item data obtaining method recording part 29 is for recording data on the method of obtaining data of each input item as an item data obtaining method database. Details of the aforementioned group database and the item data obtaining method database will be explained farther below.

The estimate knowledge recording part 23, the question data recording part 24, the step status database 26, the related item recording part 28, and the item data obtaining method recording part 29 may be realized as a non-volatile memory medium such as a hard disk device. The inference process temporary recording part 25 may be realized as work memory such as a RAM (random access memory). The aimed node stack recording part 27 may be realized as a memory device for queuing data by the last-in, first-out method.

The control part 30 is for controlling the processes by the process managing device 10 and is provided with an input display control part 31, the inference part 32, a knowledge conversion part 33, a question generating part 34, a characteristic quantity calculating part (or simply "quantity calculating part") 35 and a related item selecting part (or simply "item selecting part") 36.

The knowledge conversion part 33 is for reading out the factor estimating knowledge data recorded in the estimate knowledge recording part 23 and generating a production rule as inference knowledge. The production rule means information in a data form convenient for causing a computer to carry out the inference process for estimating factors. Details of the production rule will be explained farther below.

The question generating part 34 is for reading out question data corresponding to each step of the inference process from the question data recording part 24 in response to a request from the inference part 32 and generating questions. The characteristic quantity calculating part 35 is for reading out the inspection result data recorded in the step status database 26 in response to a request from the inference part 32 and calculating necessary characteristic quantities by carrying out statistical calculations and the like.

The related item selecting part 36 is for selecting input items related to those selected by the inference part 32. This is done by reading out data on the input data of the same groups as the input items selected by the inference part 32 from the related item recording part 28 and selecting therefrom data on the input items having an influence factor greater than a specified value.

The input display control part 31 is for receiving input data from the input part and carrying out a display control for the display part 22 and is provided with a question input-output control part (input control means) 51 and a factor output control part 52.

The question input-output control part 51 is for displaying questions on the display part 22 in response to an instruction from the inference part 32 and carrying out the processes of receiving response inputs to these questions and transmitting them to the inference part 32. The factor output control part 52 is for displaying candidates of estimated factors and data on each factor in response to an instruction from the inference part 32.

The inference part 32 is for carrying out an inference process by estimating factors and is provided with an inference process part (inference processing means) 61, a fitness calculating part (fitness calculating means) 62, a certainty calculating part (certainty calculating means) 63, an influence calculating part (influence calculating means), an item data obtaining part (item data obtaining means) 65 and an aimed node determining part (aimed node determining means) 66.

The inference process part 61 is for generally controlling the factor estimating process. The aimed node determining part 66 is for carrying out the process of determining the aimed node, or the node to be considered on the causality network. The downstream side from the aimed node becomes the range of search for input items. In the following, the downstream side of the aimed node on the causality network will be referred to as the sub-network.

The fitness calculating part 62 is for calculating, when data are obtained for an input term corresponding between specified nodes on the sub-network, the fitness factor with respect to the nodes connected to the downstream side corresponding to these data. The certainty calculating part 63 is for calculating the certainty factor regarding each estimated factor, based on fitness factor obtained by the factor estimating process.

The influence calculating part 64 is for calculating the influence factor which indicates the change in the certainty factor when data on a certain input item are obtained. The item data obtaining part 65 is for obtaining the data of the input item with the highest influence factor in the sub-network. Factors can thus be estimated efficiently because data are obtained from input terms with high influence factor, that is, the input terms which are important in estimating factors without regard to the factor estimating paths. It also makes it easier to build a network structure because it is not necessary to optimize the network structure for estimating factors efficiently.

Details of the aforementioned inference process, aimed node determining process, fitness calculating process, certainty calculating process, influence calculating process and item date obtaining process will be described farther below.

The causality network as the factor estimating knowledge data recorded in the estimate knowledge recording part 23 will be explained next. The causality network is the data that show the details of the inference from each no-good result to the factors of this no-good result (hereinafter referred to as the "no-good factors") as the knowledge of the network structure. The causality network includes a plurality of nodes on the diagnostic paths from a no-good result to its no-good factors. Diagnostic branches are formed at these nodes so as to form the diagnostic paths from a specific no-good result to a plurality of no-good factors. The causality network may be data showing knowledge having a tree structure with only one parent node.

Each node represents a specific phenomenon. If a factor of the phenomenon corresponding to a certain node has a high probability of being a phenomenon corresponding to a node on the downstream side of this node on the diagnostic path, the fitness factor is high between these two nodes.

Figure 3:
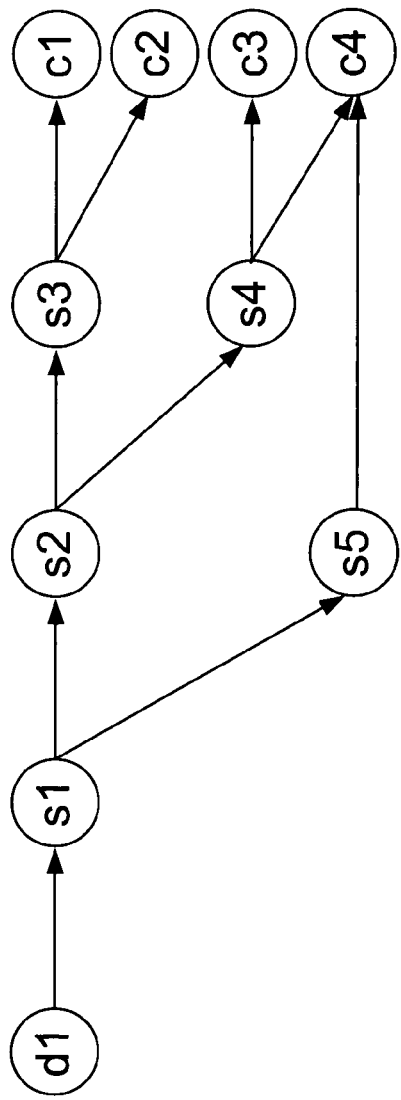
FIG. 3 is a schematic drawing of an example of causality network.
Figure 4:
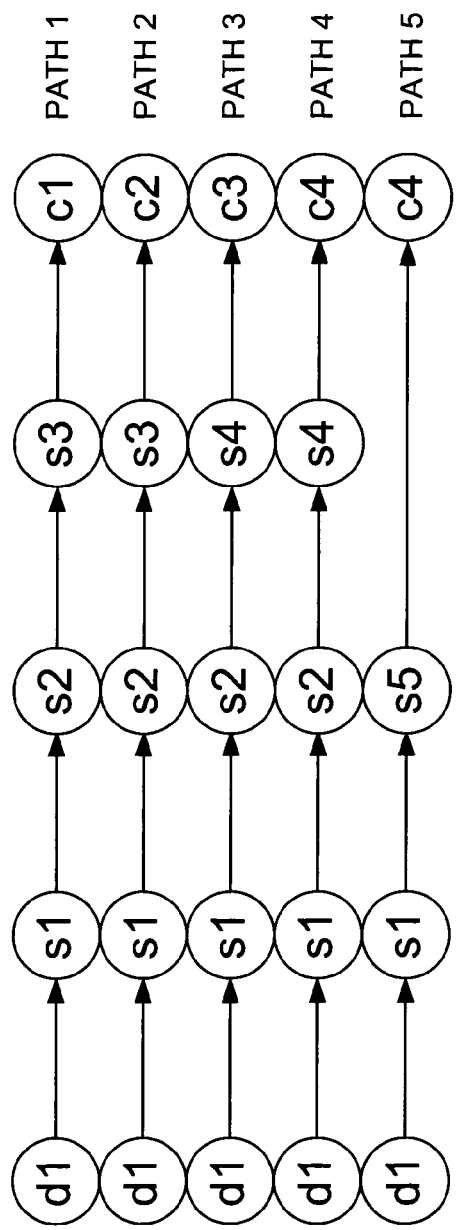
FIG. 4 shows the diagnostic paths obtained from the causality network shown in FIG. 3.

FIG. 3 is a schematic drawing of an example of causality network, dl indicating a no-good result, c1-c4 indicating no-good factors, and s1-s5 indicating phenomena corresponding to nodes. In the case of this example, four no-good factors c1-c4 are estimated as candidates corresponding to the specific no-good result dl, and diagnostic paths s1-s5 corresponding to the individual no-good factors are formed as chains of nodes. In the case of this causality network, the five diagnostic paths shown in FIG. 4 are included.

If the knowledge structure were such that the no-good factors c1-c4 are directly connected to no-good result dl, the conditions for judging the fitness factor for each no-good factor would become extremely complicated. If the knowledge structure is as shown by the network structure of FIG. 3, on the other hand, the conditions for judging the fitness factor of the no-good factors of the phenomena that cause the no-good result, the phenomena that cause each of the phenomena and the no-good factors of each of these phenomena become relatively simple if considered individually. Thus, it becomes possible to carry out the inference process for estimating factors by examining relatively simple conditions and hence that even a relatively inexperienced user can properly narrow down on factors.

Next, the process of generating a production rule from the diagnostic paths of a causality net work by the knowledge conversion part 33 will be explained. As explained above, the production rule means information in a data form convenient for causing a computer to carry out the inference process for estimating factors. The knowledge conversion part 33 functions to read out data on target diagnostic paths from the data on causality network recorded in the estimate knowledge recording part 23 and to generate a production rule corresponding to these diagnostic paths.

The production rule contains not only data on conditions between the nodes from a no-good result to a no-good factor along a specific diagnostic path but also data on the no-good factor which becomes TRUE when these conditions are all satisfied. Thus, it becomes possible to judge whether or not this no-good factor is TRUE by making the simple judgment whether or not all of the conditions between each node are satisfied, which is convenient for processing by a computer.

FIG. 5A shows an example of diagnostic path from no-good result dl through nodes as phenomena s1-s3 in this order to reach no-good factor c1. In addition, data on conditions related to f1-f4 as diagnostic knowledge corresponding to the conditions between the nodes are also set. Explained more in detail, condition f1=LARGE must be satisfied in other to estimate that no-good result d1 is due to phenomenon s1, the condition for estimating s2 from s1 is f1=LARGE, the condition for estimating s3 from s2 is f3=LARGE, and the condition for estimating c1 from s3 is f4=LARGE.

Based on such diagnostic path data, the knowledge conversion part 33 generates a production rule as shown in FIG. 5B. The production rule represents the data that the corresponding no-good factor is TRUE when the condition connecting all conditions between nodes contained in the diagnostic path from the no-good result to the no-good factor by AND is satisfied. The production rule of FIG. 5B shows the data that c1 is TRUE when all of the conditions f1=LARGE, f2=LARGE, f3=LARGE and f4=LARGE are satisfied.

When a plurality of conditions connected by AND are set as condition between nodes, the production rule represents that the corresponding no-good factor is TRUE when the condition connecting all conditions between nodes contained in the diagnostic path from the no-good result to the no-good factor inclusive of this plurality of conditions connected by AND is satisfied.

In the case of the example shown in FIG. 6A, the condition for estimating from s1 to s2 is f2=LARGE AND f5=LARGE. In this case, the production rule represents the data that c1 is TRUR when all the conditions f1=LARGE, f2=LARGE, f5=LARGE, f3=LARGE and f4=LARGE are satisfied.

When a plurality of conditions connected by OR are set as condition between nodes, production rules corresponding individually to the conditions connected by OR are generated. In other words, each production rule represents the data that the corresponding no-good factor becomes TRUE when all of the conditions between nodes other than those between nodes for which a plurality of conditions contained in the diagnostic path from the no-good result to the no-good factor and connected with OR and the condition connecting with AND any one of the conditions connected with OR are satisfied. The number of production rules that are generated is the same as the plural number of conditions connected with OR.

FIG. 7A shows an example wherein the condition for estimating from s1 to s2 is f2=LARGE OR f5=LARGE. In this case, as shown in FIG. 7B, two production rules are generated, one providing that c1 is TRUE when all of the conditions f1=LARGE, f2=LARGE, f=LARGE and f4=LARGE are satisfied and the other providing that c1 is TRUE when all of the conditions f1=LARGE, f5=LARGE, B=LARGE and f4=LARGE are satisfied.

When a supplementary path exists, a production rule connecting the conditions contained in this supplementary path with AND to the production rule corresponding to the production path leading to the same no-good factor is generated. The nodes on the supplementary path are for defining intermediate phenomena from a no-good to a factor. There may be knowledge, however, describing a phenomenon that is not an intermediate phenomenon but a phenomenon related directly to a factor such as an overall trend. Such knowledge is described as a supplementary path.

FIG. 8A shows an example with a diagnostic path from phenomenon s4 to no-good factor c1 as a supplementary path and its condition is f5=LARGE. In the situation of this example, a production rule representing that s1 is TRUE when all of the conditions f1=LARGE, f2=LARGE, f=LARGE, f4=LARGE and f5=LARGE are satisfied is generated, as shown in FIG. 8B.

Next, the process of calculating fitness by the fitness calculating part 62 is explained. Fitness factor means the degree to which the conditions set between the nodes of a production rule are satisfied. Fitness is expressed by a number between 0 and 1. The larger the number representing fitness, the higher is the degree to which a condition is satisfied.

If there are only two selection branches and a condition can be either completely satisfied or completely unsatisfied, the fitness factor can be only either 0 or 1. According to the present embodiment of the invention, the fuzzy theory is used such that answers are allowed to conditions for which the fitness factor may be greater than 0 and smaller than 1. Thus, in a situation where the response to a condition becomes ambiguous, it is possible to obtain a result of estimate reflecting this ambiguous condition. Since it becomes unnecessary to force an ambiguous response into an extreme response, it is possible to prevent inappropriate estimates from being made. Since the value of the fitness factor is indicative of the certainty factor of the estimate of the next node, the fitness factor can be used for judging the appropriateness of an estimate.

Specifically, a membership function is set to each of language values that become candidates of a response to the corresponding condition. The fitness factor for each language value is calculated according to the language value inputted as response by referencing the membership function. Explained more in detail, the fitness factor of a language value inputted as response becomes 1.0. The fitness factor of a language value other than those inputted as response is obtained by taking the smaller (min) of the membership function corresponding to that language value and the membership function corresponding to the inputted language value and calculating its maximum value (max). If the membership function corresponding to the language value inputted as response and that membership function corresponding to the inputted language value do not cross each other, the fitness factor is set to 0.0.

The language values that become the candidate for response to each condition and the data related to each membership function are recorded in the estimate knowledge recording part 23. The fitness calculating part 62 reads out these data recorded in the estimate knowledge recording part 23 and thereby calculates the fitness factor. The fitness calculating part 62 also serves to record the data related to the calculated fitness factor together with the data on the conditions corresponding to this fitness factor in the inference process temporary recording part 25.

Let us consider next a calculation process for the fitness factor wherein, as an example, a condition "Is XXX large?" is set and three responses LARGE, MEDIUM and SMALL may be imagined. FIGS. 9A and 9B are examples of membership function for these three responses. FIG. 9A is an example wherein if the response is LARGE, the fitness of LARGE is 1.0, that of MEDIUM is 0.5 and that of SMALL is 0.0. FIG. 9B is another example wherein if the response is LARGE, the fitness of LARGE is 1.0, that of MEDIUM is 0.7 and that of SMALL is 0.3.

Next, the process of calculating the certainty factor by the certainty calculating part 63 is explained. Certainty is a value which is set corresponding to each no-good factor, indicating the possibility that this no-good factor is really the causing factor of the no-good result that is the object to be estimated.

To obtain the value of certainty, a production rule corresponding to the diagnostic path leading to the corresponding no-good factor from the no-good result to be estimated is extracted first. Next, conditions for which fitness factor has been calculated are extracted from the conditions contained in this extracted production rule and, the one of them having the smallest value of fitness is set as the certainty factor. If a plurality of production rules exist, corresponding to the diagnostic path from the target no-good result to be estimated from the corresponding no-good factor, certainty is calculated for each of these production rules and the largest of the calculated certainty factors is set as the certainty factor for this no-good factor.

The certainty calculating part 63 also serves to read out data on fitness factors recorded in the inference process temporary recording part 25 as well as data on the conditions corresponding to these fitness factors to thereby obtain required fitness factors and to calculate the certainty factor. The calculated certainty factor is recorded in the inference process temporary recording part 25 together with the data on the corresponding no-good factor.

In the case of the example shown in FIGS. 7A and 7B, the certainty factor for no-good factor corresponding to c1 is calculated as follows. First, fitness factors g1-g5 corresponding to all of the conditions f1-f5 are extracted. Certainty factor for no-good factor c1 is then given as follows:

Certainty factor $(c1)=\max(\min(g1, g2, g3, g4), \min(g1, g2, g3, g4, g5))$.

Although the smallest of the fitness factors of the conditions contained in the extracted production rule according to the example described above, this is not intended to be always the case. It may be another value representative of the assembly of the fitness factors included in the production rule, such as their average value.

The certainly factor need not be set as a representative value of fitness factors but any score which may look reasonable may be used such as an after-the-fact probability, a score based on an after-the-fact probability or a score based on a distance such as the Euclid distance.

Next, the process of calculating the influence factor by the influence calculating part 64 is explained. The influence factor is a value which is set corresponding to each input item, being the value that shows the total sum of changes in the certain factors for all input items. Thus, the influence factor may be expressed as follows:

(Influence factor)=$\Sigma_c$|(current certainty factor)−(predicted certainty factor)| where $\Sigma_c$ indicates the total sum over the no-good factors.

Explained more in detail, the influence calculating part 64 obtains the required certainty factors by reading out data on the current certainty factors recorded in the inference process temporary recording part 25. FIG. 10 shows an example of current certainty factors recorded in the inference process temporary recording part 25. As shown, certainty factors are recorded for each no-good factor.

Next, the influence calculating part 64 causes the fitness calculating part 62 to calculate fitness factor on the assumption that data on a certain input item have been obtained. The fitness factor thus obtained becomes what is referred to as the predicted certainty factor above. Next, the influence calculating part 64 uses the formula given above to calculate the influence factor. This process is repeated for each of the input items contained in the sub-network, and the calculated influence factor is recorded in the inference process temporary recording part 25 together with data on the corresponding input item (or its item ID).

Next, the process of obtaining data on input items by the item data obtaining part 65 is explained. The item data obtaining part 65 reads out the influence factor corresponding to each input item within the sub-network from the inference process temporary recording part 25 and identifies the input item with the highest influence factor. If no input item exists within the sub-network or if there is no input item with influence factor higher than a specified threshold value, the item data obtaining part 65 completes the process for obtaining data and reports to this effect to the aimed node determining part 66 because there would be no effect or little effect on the certainty factor even if more data on input items within this sub-network were further obtained.

The item data obtaining part 65 transmits data on the identified input item (hereinafter referred to as the identified item) to the item selecting part 36. The item selecting part 36 reads out the input items related to the identified item (hereinafter referred to as the related item) from the related item recording part 28. FIG. 11 shows an example of group database recorded in the related item recording part 28. As shown, the group database contains for each group the group ID for distinguishing the group and the item IDs of the input items included in the group.

In other words, the item selecting part 36 serves to receive the item ID of the identified item from the item data obtaining part 65, to identify the group ID including the received item ID and to read out other item IDs included in the identified group ID. The item IDs that have been read out are transmitted to the item data obtaining part 65 as data on the related item.

Thus, when data on the identified item are obtained, data on the related items are also obtained. In this situation, there is a high possibility that the questions to be asked to the user for obtaining the data on the identified item and those for obtaining the data on the related items be related. Consistency in the flow of questions can thus be maintained.

The item selecting part 36 may preferably read out of the inference process temporary recording part 25 the influence factor corresponding to the item ID which has been read out and exclude those item IDs with influence factors lower than a specified value from the item IDs to be transmitted to the item data obtaining part 65 such that useless data of input items can be prevented from being obtained.

Thereafter, the item data obtaining part 65 reads out data on the method of obtaining data corresponding to the identified and related items from the obtaining method recording part 29.

FIG. 12 shows an example of item data obtaining method database recorded in the obtaining method recording part 29. As shown, the obtaining method recording part 29 stores for each input item the item ID for distinguishing the input item, data showing whether data on the input item are to be obtained either from a person or from the inspection result or they are to be obtained from both, a question ID for distinguishing a question when it is to be done by a person and data on a calculation algorithm when it is done by an inspection result. When the data on input item are obtained only from a person, NULL is entered as data on calculation algorithm. When the data on input item are obtained only from an inspection result, NULL is entered as question ID.

In other words, the item data obtaining part 65 references the item data obtaining method database and obtains a question ID and/or a calculation algorithm corresponding to each of the identified and related items. When the data are to be obtained only either from a person or from an inspection result, the item data obtaining part 65 has only to judge whether they should be obtained from a person or from an inspection result based on the cost and the time of labor.

Next, the item data obtaining part 65 obtains data on the identified and related items. This is to say that if a question ID is obtained from the obtaining method recording part 29, the item data obtaining part 65 transmits the question ID to the question generating part 34.

The question generating part 34 generates a question by reading out from the question data recording part 24 data corresponding to the question ID received from the item data obtaining part 65. FIG. 13 shows an example of question database recorded in the question data recording part 24. As shown, the question database stores for each question the question ID, the content of the question and the selection branches of the response to the question.

In other words, the question generating part 34 reads out the question and the selection branches corresponding to a question ID from the question data recording part 24. The question and the selection branches that have been read out are displayed on the display part 22. The response from the user is transmitted through the input part 21 and the question input-output control part 51 to the item data obtaining part 65. The item data obtaining part 65 generates data on the input item based on the received response.

If data on calculation algorithm are obtained from the obtaining method recording part 29, the item data obtaining part 65 transmits the data on calculation algorithm to the characteristic quantity calculating part 35. The characteristic quantity calculating part 35 serves to obtain a characteristic quantity by carrying out a calculation based on the received data on calculation algorithm and transmits the obtained characteristic quantity to the item data obtaining part 65. The item data obtaining part 65 generates data on the input item based on the received characteristic quantity.

The item data obtaining part 65 further serves to record the generated data on the input item together with the corresponding item ID in the inference process temporary recording part 25. FIG. 14 shows an example of data on input items recorded in the inference process temporary recording part 25. As shown, the data format of the input items is determined for each input item such as TRUE and FALSE corresponding to responses YES and NO, LARGE, MEDIUM and SMALL corresponding to responses large, medium and small, and numeral values corresponding to characteristic quantities. NULL is entered where data are not inputted yet. From the above, it can be easily judged whether or not data corresponding to each of the input items have been inputted.

Next, the process of determining the aimed node by the aimed node determining part 66 is explained. If the data on an input item obtained by the item data obtaining part 65 satisfy the condition corresponding to this input item, the aimed node determining part 66 determines the node to which the condition branches as the aimed node. The aimed node determining part 66 pushes the node ID of the aimed node thus determined to the aimed node stack recording part 27. In this manner, the sub-network can be narrowed down. When questions are asked to the user for obtaining data on the input items, consistency in the flow of questions is not adversely affected because questions are asked corresponding to the input items in the sub-network which is sequentially narrowed down.

If there is no input item on which the data are not worth obtaining by the item data obtaining part 65, the aimed node determining part 66 returns the aimed node back by popping it from the aimed node stack recording part 27. In this way, it is possible to return to the earlier wider sub-network and to search for an input item for which it is worth obtaining data. A similar flow of questions can be maintained by returning to the sub-network immediately before narrowed down.

The process of inference is terminated when node IDs recorded in the aimed node stack recording part 27 cease to exist because of the popping since this means that there is no longer any input item in the causality network for which data are worth obtaining. The results of the diagnosis are displayed on the display device 22 through the factor output control part 52.

Figure 15:
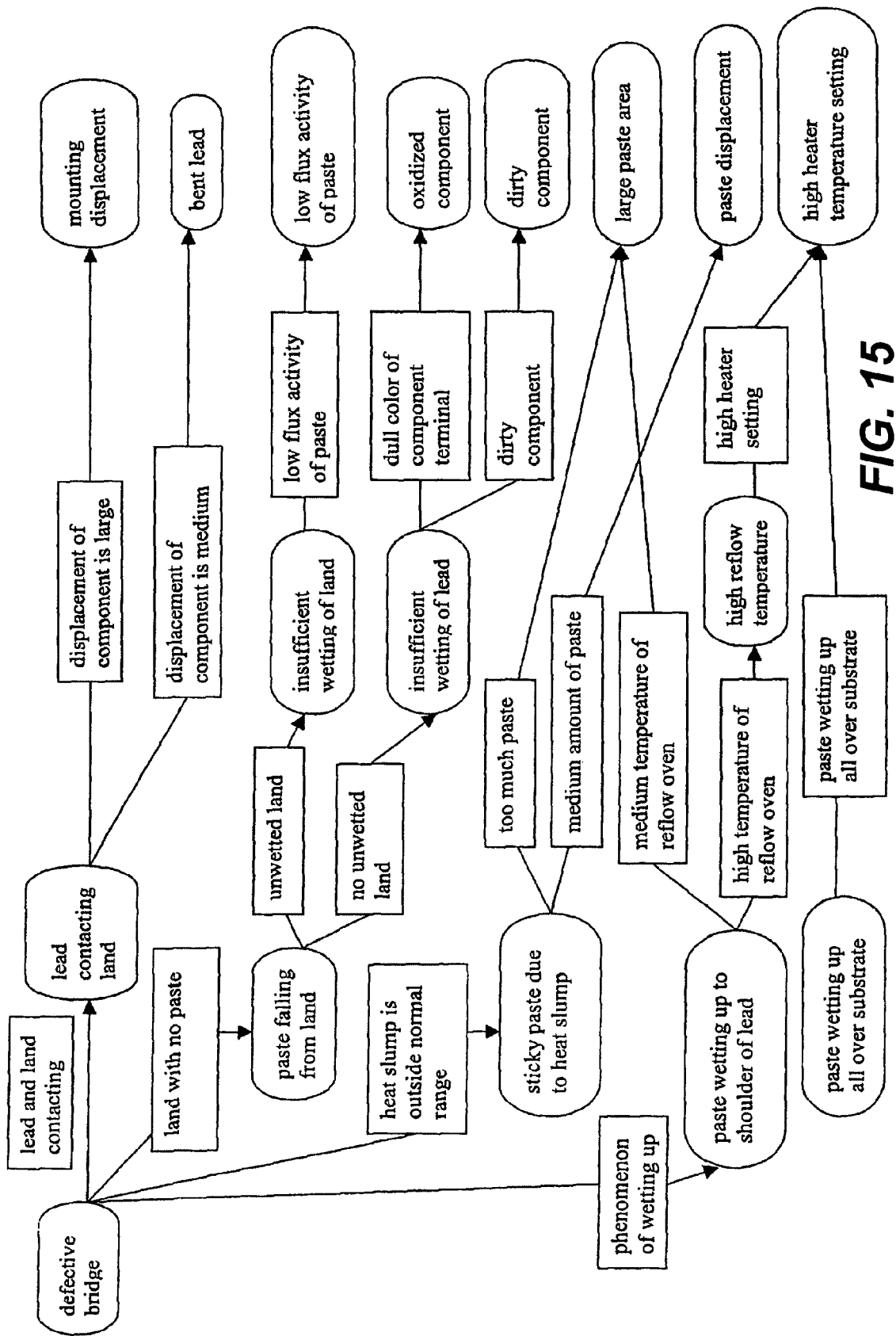
FIG. 15 is a knowledge structure diagram for showing an example of causality network.

Next, an example of causality network is explained with reference to FIG. 15. FIG. 15 shows a causality network for no-good result "defective bridge" for which the following eight no-good factors are candidates: "mounting displacement", "bent lead", "low flux activity of paste", "oxidized component", "dirty component", "large paste area", "paste displacement", and "high heater temperature setting". Diagnostic paths from no-good result "defective bridge" to these eight no-good factors are set as the knowledge of the network structure.

In the case of the example of FIG. 15, the production rules obtained from the diagnostic paths leading to the three no-good factors "mounting displacement", "bent lead" and "low flux activity of paste" are respectively as follows:

IF ((lead and land contacting)=Yes & (component displacement)=(LARGE)) then (mounting displacement);

IF ((lead and land contacting)=Yes & (component displacement)=(MEDIUM)) then (bent lead); and IF ((land with no paste)=Yes & (land with wetting problem)=Yes & (flux activity of paste)=(LOW)) then (low flux activity of paste).

In the example of FIG. 15, since there are two diagnostic paths that lead to no-good factor "large paste area", there are the following two production rules that are obtained:

IF ((heat slump outside normal range)=Yes & (amount of paste)=(too much)) then (area of paste is too large); and IF ((paste wetting up to shoulder of lead)=Yes & (temperature of reflow oven)=(medium) then (area of paste is too large).

In the example of FIG. 15, since the diagnostic path that leads to no-good factor "high heater temperature setting" includes a supplementary path, the production rule obtain obtained therefrom becomes as follows:

IF ((paste wetting up to shoulder of lead)=Yes & (temperature of reflow oven)=(high) & (heater setting)=(high) & (paste wetting up all over substrate)=Yes) then (large paste area).

Figure 16:
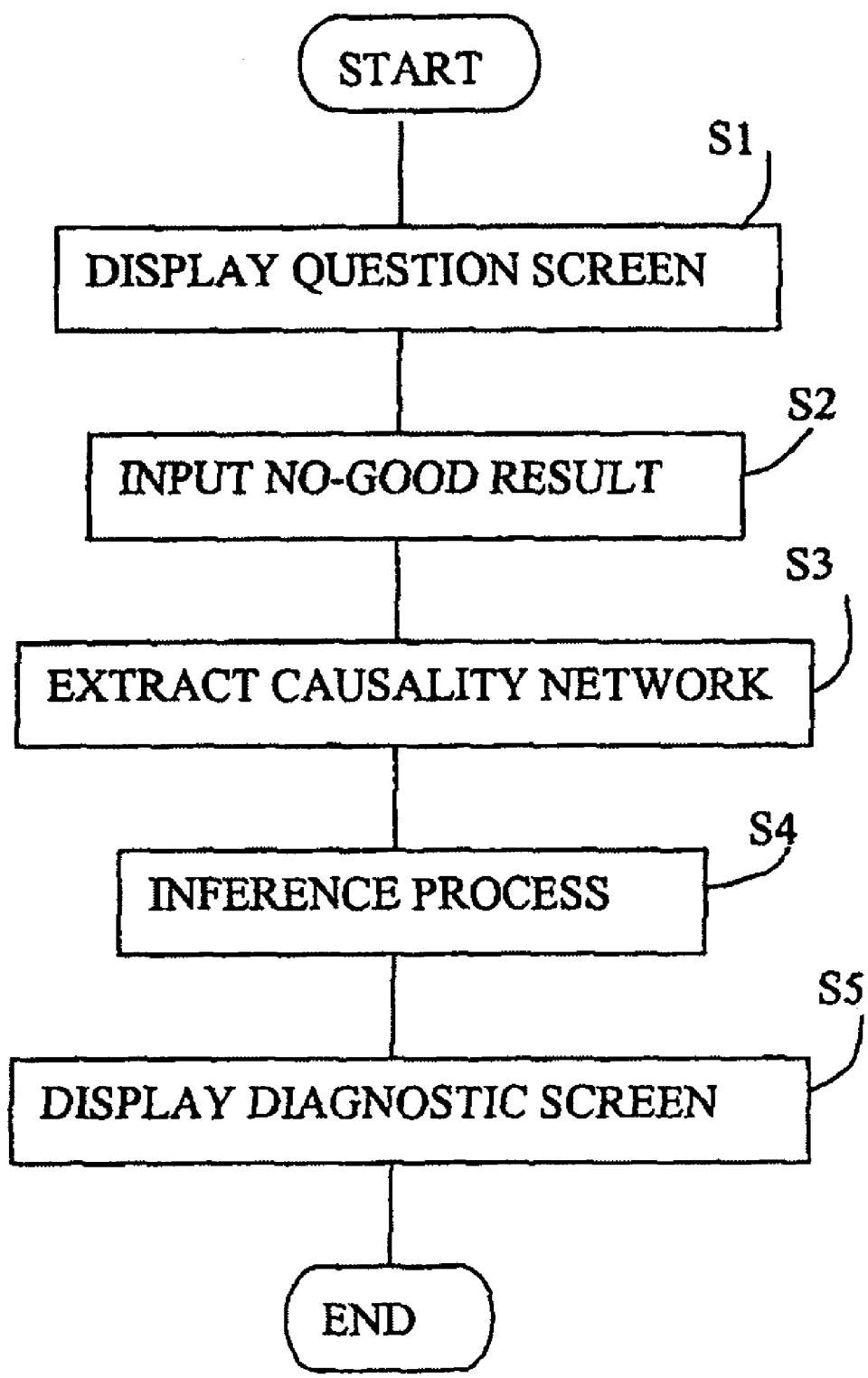
FIG. 16 is a flowchart for showing the flow of the factor estimating process.

Next, the flow of the factor estimating process is explained with reference to the flowchart shown in FIG. 16. As this process is started, the input display control part 31 causes a question screen to be displayed on the display part 22 (Step S1). An area for inputting a no-good result is provided to the question display area on this question screen. The user inputs a no-good result in this area and the inputted data area received by the question input-output control part 51 (Step S2), and the no-good result data are recorded in the inference process temporary recording part 25 by means of the inference process part 61.

As a no-good result is inputted, the inference process part 61 extracts data on the causality network corresponding to this no-good result from the estimate knowledge recording part 23 (Step S3). At the time, the inference process part 61 obtains data on the causality network converted to a production rule by the knowledge conversion part 33, and the inference part 32 carries out the inference process based on the extracted causality network (Step S4). After the inference process is finished, the screen of the result of diagnosis is displayed on the display part 22 by the factor output control part 52 (Step S5). The factor estimating process is thereafter finished.

Figure 17:
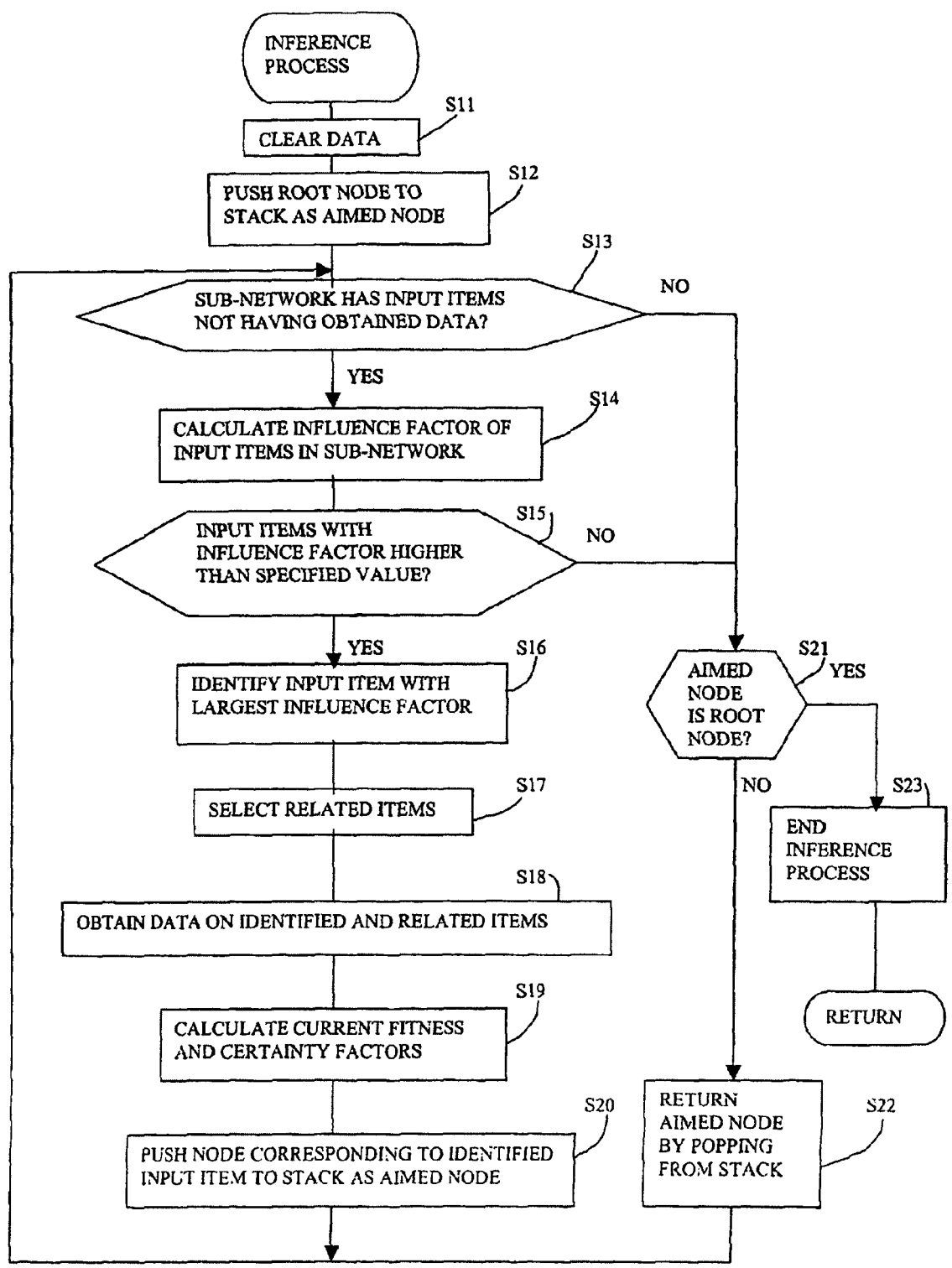
FIG. 17 is a flowchart for showing the flow of the inference process in the factor estimating process of FIG. 16.

Next, the flow of the inference process in Step S4 will be explained with reference to the flowchart of FIG. 17. As the inference process is started, the data of various kinds recorded in the inference process temporary recording part 25 are cleared first (Step S11), together with the data recorded in the aimed node stack recording part 27.

Next, the aimed node determining part 66 treats a root node (node of a no-good result) as the aimed node and pushes the corresponding node ID to the aimed node stack recording part 27 (Step S12). Next, the data on input items recorded in the inference process temporary recording part 25 (as shown in FIG. 14) are referenced and it is judged whether or not there is any input item not having data obtained within the sub-network (Step S13).

If such an input item exists (YES in Step S13), the influence calculating part 64 calculates the influence factor of each input item contained in the sub-network and records it in the inference process temporary recording part 25 (Step S14). The input items having data obtained are excluded because their influence factors are zero. Next, the item data obtaining part 65 judges whether or not there are input items with influence factor higher than a specified value (Step S15).

If such an input item exists (YES in Step S15), the item data obtaining part 65 identifies the input item with the highest influence factor as the identified item (Step S116) and selects the input items that are in the same group as this identified item and have an influence factor higher than the specified value as related items (Step S117). Next, the item data obtaining part 65 obtains data on the identified and related items (Step S18). Next, the fitness calculating part 62 calculates the current fitness factor and the certainty calculating part 63 calculates the certainty factor based on the obtained data (Step S19). The corresponding node ID is then pushed to the aimed node stack recording part 27 with the node corresponding to the identified node as the aimed node (Step S20). The program returns thereafter to Step S13 and repeats the operations described above.

If there is no input item not having data obtained within the sub-network (NO in Step S13) or if there is no input item with influence factor higher than the specified value (NO in Step S15), the aimed node determining part 66 judges whether the aimed node is a root node or not (Step S21). If the aimed node is not a root node (NO in Step S21), the aimed node determining part 66 returns the aimed node by popping it from the aimed node stack recording part 27 (Step S22), and the program returns thereafter to Step S13.

If the aimed node is a root node (YES in Step S21), the inference process is terminated (Step S23) because this amounts to having no input item for which data are worth obtaining, and the program returns to the beginning, causing the factor output control part 52 to have an image of the result of the inference on the display part 22 (Step S5) and terminating the factor estimating process.

Examples of display of diagnostic results are explained next with reference to FIGS. 18 and 19. The display screen according to these examples is provided with a question display area and a result display area. The question display area is for displaying the history of questions offered to the user during the course of the factor estimating process and the user's responses thereto. The question input-output control part 51 displays the history by reading out the history recorded in the inference process temporary recording part 25. The result display area is for displaying the diagnostic paths leading to the selected no-good factor. These diagnostic paths are extracted from the causality network by the inference process part 61, and the extracted diagnostic paths are displayed in the result display area by the factor output control part 52.

On these diagnostic paths, numeral data on the fitness factors corresponding to the paths between nodes are displayed. Each path may be displayed with a thickness representing the corresponding fitness. It goes without saying, however, that this is not the only way to represent the fitness. Any display mode is usable if the user can easily recognize the degree of fitness.

Thus, since the history of questions and responses regarding identified no-good factors and data on diagnostic paths are displayed, it is possible to demonstrate to the user the justification of the result of estimating factors.

Figure 18:
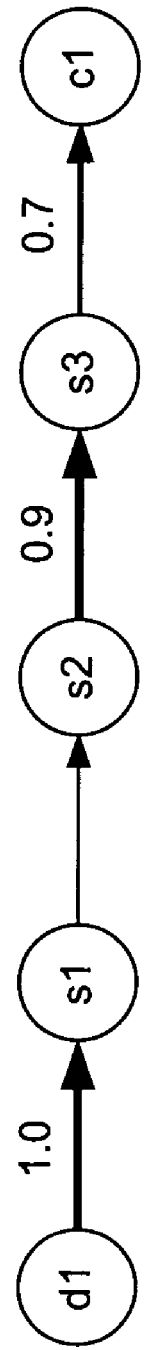
FIG. 18 is a display screen diagram showing an example of diagnostic screen that displays a diagnostic result for a no-good factor.
Figure 19:
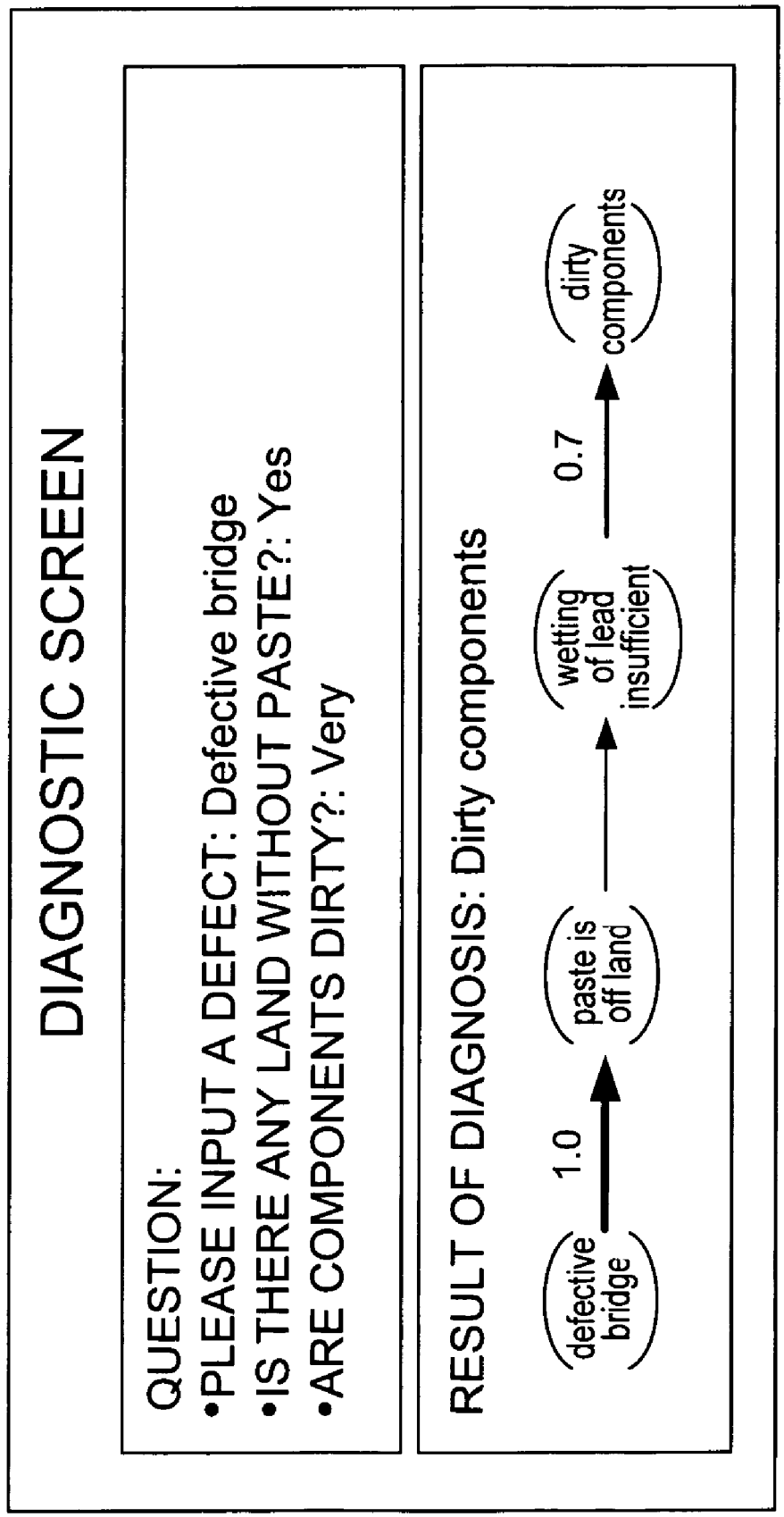
FIG. 19 is a display screen diagram showing an example of the diagnostic screen.

FIG. 18 shows an example of diagnostic result on no-good factor c1 corresponding to no-good result dl, and FIG. 19 shows another diagnostic result on no-good result "dirty component" corresponding to no-good result "defective bridge". As indicated by these examples, a diagnostic result may be displayed even if data on all input items included in diagnostic paths are not obtained. A diagnostic result may be displayed under the condition where data on all input items included in diagnostic paths are obtained. It depends on the influence factor of each of the input items whether or not data on the input items can be obtained.

Although an embodiment of the invention was shown above wherein the item data obtaining part 65 identifies the input item with the highest influence factor and obtains data on the identified and related items by selecting other input items which are in the same group as the identified item or the identified input item, the item data obtaining part 65 may instead calculate the total sum of the influence factors of the input items belonging to each group and obtain the data on the input items included in the group having the largest total sum of influence factors.

Although the group database recorded in the related item recording part 28 according to the embodiment described above contains item IDs of the related input items for each group, the order of obtaining data of each input item may be contained. In such a case, the item data obtaining part 65 follows this order to ask questions to obtain responses or to obtain characteristic quantities from inspection data.

The aforementioned group database may include the order in which an analysis is carried out after data on each input item are obtained. In such a case, the item data obtaining part 65 follows this order to calculate the fitness and certainty factors after obtaining data of each input item. Since important input items may be analyzed first, it is preferable for the aimed node determining part 66 to push the aimed node stack recording part 27 in the reverse order. In this case, the node corresponding to the input item which is the first in the order becomes the aimed node.

According to the embodiment described above, the aimed node determining part 66 considers the root node as the first aimed node. In this case, the sub-network becomes the same as the causality network, making the search area large such that it becomes time-consuming to obtain the influence factor of each input item. For this reason, the input items may be preliminarily classified on the basis of a specified condition such as the type of the steps such that the search area of the sub-network may be somewhat narrowed down by the user specifying a class.

Figure 20:
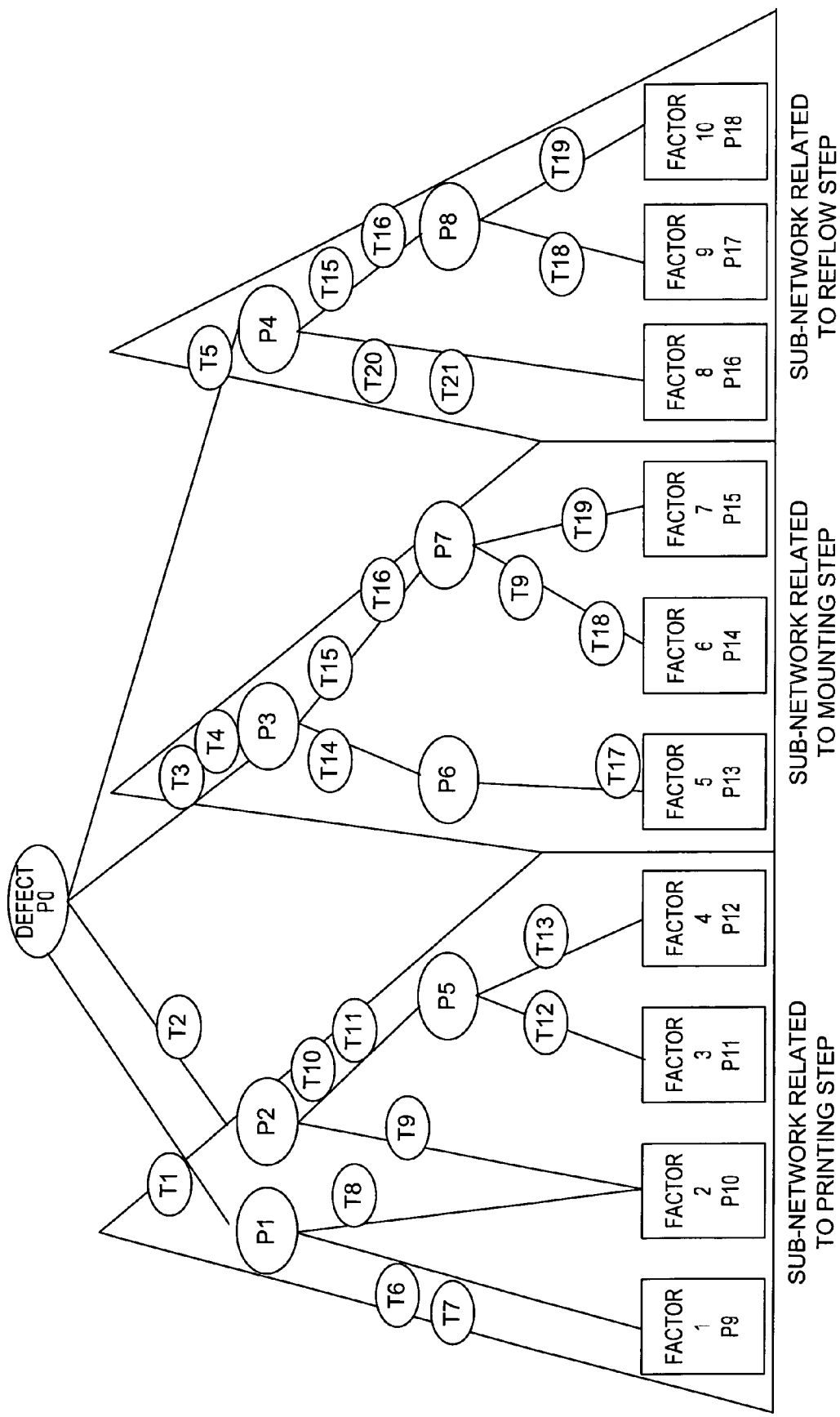
FIG. 20 is a knowledge structure diagram showing another example of causality network.

FIG. 20 shows another example of causality network related to the substrate mounting process. The substrate mounting process consists roughly of the following three steps, the printing step, the mounting step and the reflow step, and input items are preliminarily classified into these steps. In this example, nodes P1, P2, P5 and P9-P12 and input items T1, T2 and T6-T13 are classified into the printing step, nodes P3, P6, P7 and P13-P15 and input items T3, T4, T9 and T14-T19 are classified into the mounting step and nodes P4, P8 and P16-P18 and input items T5, T15, T16 and T18-T21 are classified into the reflow step.

If the user guesses that the no-good factor is in the printing step and specifies the classification of the printing step, it is possible to narrow down to the sub-network including nodes P1, P2, P5 and P9-P12 and input items T1, T2 and T6-T13 and to reduce the time for obtaining the influence factor of each of the input items in the sub-network. When the aimed node returns again to the root node, those related to the printing step can be excluded from the search area and the time for obtaining the influence factor of each input item can be prevented from significantly increasing.

The description given above is not intended to limit the invention. Many modifications and variations are possible within the scope of the invention. For example, although the invention was described above as applied to a process managing system for estimating no-good factors for a production line, the invention is not limited to process managing systems but may also be applied to different kinds of software as an aid to responding to a claim process, aid systems for workers carrying out periodic inspections and devices of different kinds for estimating factors such as tools for aiding the sale of customized products.

Each block of the control part 30 of the process managing device 10 may be formed by hardware logic or may be realized by software by using a CPU. Explained more specifically, the control part 30 may comprise a CPU for carrying out instructions of a control program for realizing various functions, a ROM for storing this program, a RAM for the development of the program and memory media such as memory device for recording the program as well as data of various types. The object of the present invention can be accomplished by supplying the control part 30 with a memory medium recording the program code (executable program, intermediate code program and source program) of the control program of the control part 30, or the software for carrying out the aforementioned functions, in a computer-readable form and causing this computer (CPU or MPU) to read out the program code recorded on the memory medium and execute it.

Examples of the aforementioned tangible memory medium include tapes such as magnetic tapes and cassette tapes, disks such as magnetic disks including floppy and hard disks and optical disks including CD-ROM, MO, MD, DVD and CD-R, cards such as IC cards (inclusive of memory cards) and optical cards and semiconductor memories such as mask ROM, EPROM, EEPROM and flash ROM. The control part 30 may be structured to be connectable to a communication network such that the program code can be supplied through the communication network. There is no particular limitation as to the kind of communication network. Internet, intranet, extranet, LAN, ISDN, VAN, CATV communication network, virtual private network, telephone network, mobile communication network and satellite communication network may be used. There is no particular limitation as to transmission medium forming the communication network. Lines such as IEEE1394, USB, power transmission, cable TV lines, telephone lines and ADSL lines and wireless means such as IrDA and remote control infrared lines, Bluetooth®, 802.22 wireless, HDR, portable telephone network, satellite lines and ground wave digital network may be utilized. The present invention can be realized also in the form of computer data signal buried in carrier waves.

Factor estimating devices of this invention are useful to a process managing system for estimating no-good factors for a production line but this does not limit the invention. They are applicable to apparatus of different types for estimating factors such as software for aiding claim processing, systems for aiding workers carrying out periodic inspections and tools for aiding the sale of customized products.

What is claimed is:

1. A factor estimating device for estimating a factor from a result generated in a target system for diagnosis, said factor estimating device comprising;
   an estimate knowledge recording part for recording factor estimating knowledge data that correlate one or more candidates for factor to each of a plurality of results that may be generated in said target system and show factor estimating paths from each of said results to each of said candidates corresponding to said each result as knowledge of a network structure having condition branches;
   inference processing means for carrying out factor estimating process based on said factor estimating knowledge data recorded in said estimate knowledge recording part;
   item data obtaining means for obtaining data on input item corresponding to conditions contained in said factor estimating knowledge data while said inference processing means carries out said factor estimating process;
   fitness calculating means for calculating fitness factors based on the data obtained by said item data obtaining means, said fitness factors being indicative of degrees to which said conditions are satisfied;
   certainty calculating means for calculating for each of the factors a representative value of an assembly of fitness factors corresponding to a condition contained in said factor estimating paths as certainty factor; and
   influence calculating means for calculating influence factor for each of input items indicative of degree of influence on the certainty factor when said data on said input item are obtained regarding a certain input item;
   wherein said item data obtaining means obtains data on a selected input item by considering the influence factors.

2. The factor estimating device of claim 1 further comprising aimed node determining means for determining as an aimed node, when data obtained by said item data obtaining means satisfy a condition, the node to which said satisfied condition branches;
   said item data obtaining means obtaining data of an input item selected out of those of input items corresponding to said aimed node and nodes on the downstream side of said aimed node by considering the influence factors.

3. The factor estimating device of claim 2 wherein said aimed node determining means determines an earlier determined aimed node as the aimed node if there is no input item with influence factor higher than a specified value.

4. The factor estimating device of claim 1 further comprising a related item recording part for grouping and recording data on a plurality of related input items;
   wherein said item data obtaining means obtains not only data on a selected input item by considering the influence factors but also data on input items that belong to same group as said selected input item.

5. The factor estimating device of claim 4 further comprising a related item recording part for grouping and recording data on a plurality of related input items;
   said item data obtaining means obtaining not only data on said selected input item by considering the influence factors but also data on input items that belong to same group as said selected input item and have influence factors higher than a specified value.

6. The factor estimating device of claim 1 further comprising input control means for obtaining a user's response to a question corresponding to a condition contained in said factor estimating knowledge data;
   wherein said item data obtaining means obtains said data on said input item based on said response obtained by said input control means.

7. The factor estimating device of claim 6 further comprising:
   inspection result inputting means for receiving inspection result data from an inspection device that inspects said target system;
   an inspection result recording part that records said inspection result data received by said inspection result inputting means; and
   an obtaining method recording part for recording data on an obtaining method indicating whether said data on said input item are obtained either from a user or from said inspection result data or from both said user and said inspection result, as well as said data on said input item;
   wherein said item data obtaining means obtains said data on said input item based on said data on the obtaining method corresponding to said input item.

8. The factor estimating device of claim 1 that estimates a factor from a no-good result generated in a processing system which carries out processes on a target object.

9. A program storage device readable by a machine, tangibly embodying a program of instructions executable by said machine to a factor estimating device for estimating a factor from a result generated in a target system of diagnosis; said factor estimating device comprising;
   an estimate knowledge recording part for recording factor estimating knowledge data that correlate one or more candidates for factor to each of a plurality of results that may be generated in said target system and show factor estimating paths from each of said results to each of said candidates corresponding to said each result as knowledge of a network structure having condition branches;
   inference processing means for carrying out factor estimating process based on said factor estimating knowledge data recorded in said estimate knowledge recording part;
   item data obtaining means for obtaining data on input item corresponding to conditions contained in said factor estimating knowledge data while said inference processing means carries out said factor estimating process;
   fitness calculating means for calculating fitness factors based on the data obtained by said item data obtaining means, said fitness factors being indicative of degrees to which said conditions are satisfied;
   certainty calculating means for calculating for each of the factors a representative value of an assembly of fitness factors corresponding to a condition contained in said factor estimating paths as certainty factor; and
   influence calculating means for calculating influence factor for each of input items indicative of degree of influence on the certainty factor when said data on said input item related are obtained regarding a certain input item;
   wherein said item data obtaining means obtains data on a selected input item by considering the influence factors.

10. The program storage device of claim 9 wherein said factor estimating device further comprises aimed node determining means for determining as an aimed node, when data obtained by said item data obtaining means satisfy a condition, the node to which said satisfied condition branches;
    said item data obtaining means obtaining data of an input item selected out of those of input items corresponding to said aimed node and nodes on the downstream side of said aimed node by considering the influence factors.

11. The program storage device of claim 10 wherein said aimed node determining means determines an earlier determined aimed node as the aimed node if there is no input item with influence factor higher than a specified value.

12. The program storage device of claim 9 wherein said factor estimating device further comprises a related item recording part for grouping and recording data on a plurality of related input items;
    wherein said item data obtaining means obtains not only data on a selected input item by considering the influence factors but also data on input items that belong to same group as said selected input item.

13. The program storage device of claim 12 wherein said factor estimating device further comprises a related item recording part for grouping and recording data on a plurality of related input items;
    said item data obtaining means obtaining not only data on a selected input item by considering the influence factors but also data on input items that belong to same group as said selected input item and have influence factors higher than a specified value.

14. The program storage device of claim 9 wherein said factor estimating device further comprises input control means for obtaining a user's response to a question corresponding to a condition contained in said factor estimating knowledge data;
    wherein said item data obtaining means obtains said data on said input item based on said response obtained by said input control means.

15. The program storage device of claim 14 wherein said factor estimating device further comprises:
    inspection result inputting means for receiving inspection result data from an inspection device that inspects said target system;
    an inspection result recording part that records said inspection result data received by said inspection result inputting means; and
    an obtaining method recording part for recording data on an obtaining method indicating whether said data on said input item are obtained either from a user or from said inspection result data or from both said user and said inspection result, as well as said data on said input item;
    wherein said item data obtaining means obtains said data on said input item based on said data on the obtaining method corresponding to said input item.

16. The program storage device of claim 9 wherein said factor estimating device estimates a factor from a no-good result generated in a processing system which carries out processes on a target object.

17. A method of estimating a factor by a factor estimating device for estimating a factor from a result generated in a target system for diagnosis, said factor estimating device being provided with an estimate knowledge recording part for recording factor estimating knowledge data that correlate one or more candidates for factor to each of a plurality of results that may be generated in said target system and show factor estimating paths from each of said results to each of said candidates corresponding to said each result as knowledge of a network structure having condition branches, said method comprising:

- an inference step of carrying out factor estimating process based on said factor estimating knowledge data recorded in said estimate knowledge recording part;
- an item data obtaining step of obtaining data on input item corresponding to conditions contained in said factor estimating knowledge data during said factor estimating process in said inference step;
- a fitness calculating step of calculating fitness factors based on the data obtained in said item data obtaining step, said fitness factors being indicative of degrees to which said conditions are satisfied;
- a certainty calculating step of calculating for each of the factors a representative value of an assembly of fitness factors corresponding to a condition contained in said factor estimating paths as certainty factor; and
- an influence calculating step of calculating influence factor for each of input items indicative of degree of influence on the certainty factor when said data on said input item are obtained regarding a certain input item;
- wherein said item data obtaining means obtains data on a selected input item by considering the influence factors.

\* \* \* \* \*